United States Patent [19]

Oakey

[11] 4,121,870

[45] Oct. 24, 1978

[54] REMOVABLE TRANSPARENT ROOF PANEL FOR MOTOR VEHICLES

[76] Inventor: Edwin James Oakey, 16288 Forestview, Fraser, Mich. 48026

[21] Appl. No.: 734,719

[22] Filed: Oct. 22, 1976

[51] Int. Cl.² .............................................. B60J 7/02
[52] U.S. Cl. ................................................ 296/137 B
[58] Field of Search ............... 296/137 B, 137 R, 15, 296/146, 93; 52/208, 614, 624, 656

[56] References Cited

U.S. PATENT DOCUMENTS

| | | | |
|---|---|---|---|
| 2,556,062 | 6/1951 | Buehrig | 296/137 B |
| 2,714,035 | 6/1955 | Limberg | 296/146 |
| 3,155,204 | 11/1964 | Campbell | 52/208 |
| 3,425,176 | 2/1969 | Cairns | 52/208 |
| 3,993,348 | 11/1976 | Pizzuth | 296/137 E |

Primary Examiner—Robert R. Song
Attorney, Agent, or Firm—Harness, Dickey & Pierce

[57] ABSTRACT

There is disclosed herein a removable roof panel adapted to be installed in an opening provided in a portion of a motor vehicle roof structure and comprising a contoured molded plastic composition frame member which surrounds and supports a similarly contoured transparent member fixedly secured to the frame member without the need for any molding strips therearound. Both the frame member and the transparent member are contoured so as to conform to the overall contour of the roof structure thereby presenting a clean uncluttered appearance so as to blend smoothly with the style lines of the vehicle.

20 Claims, 7 Drawing Figures

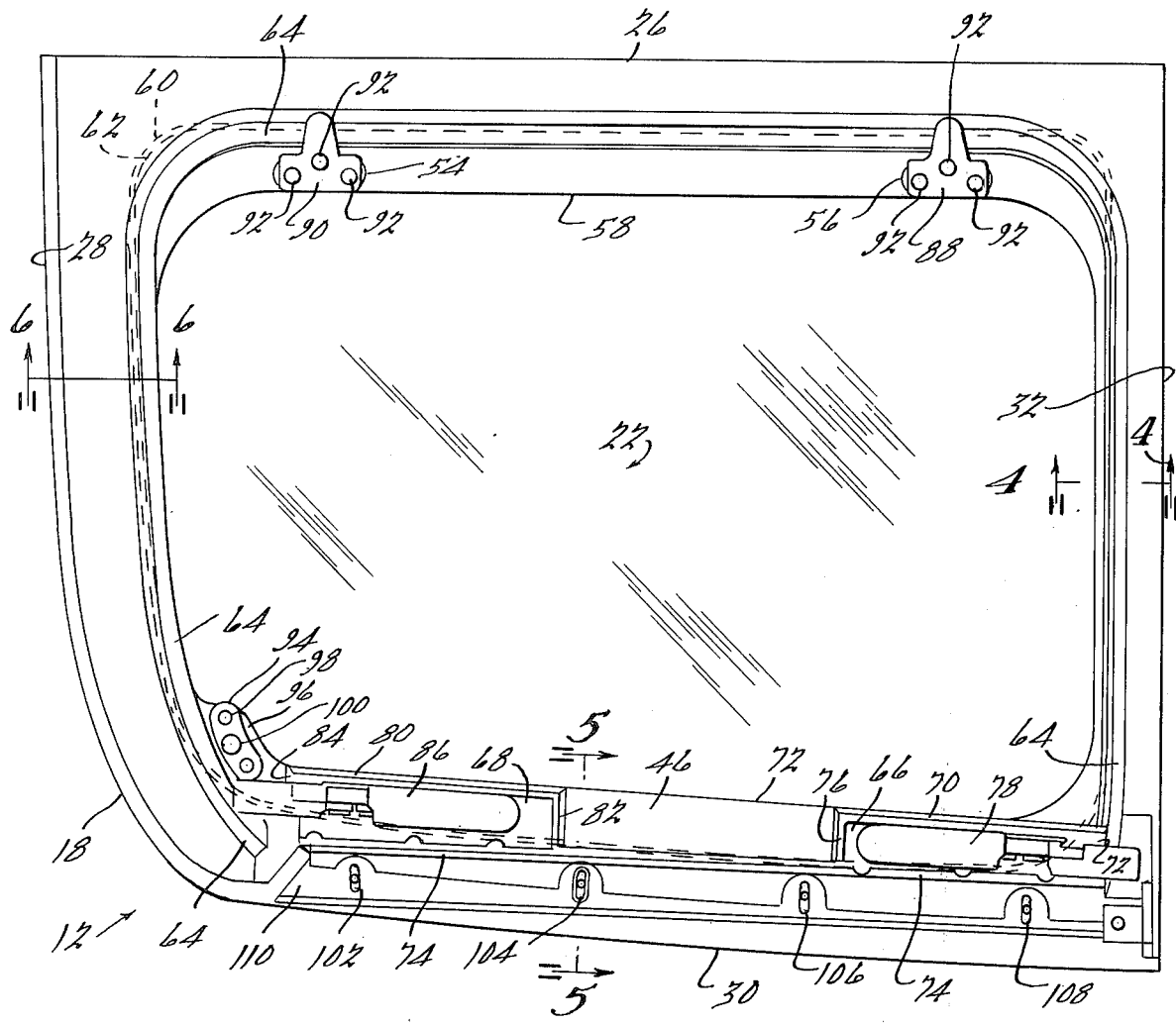
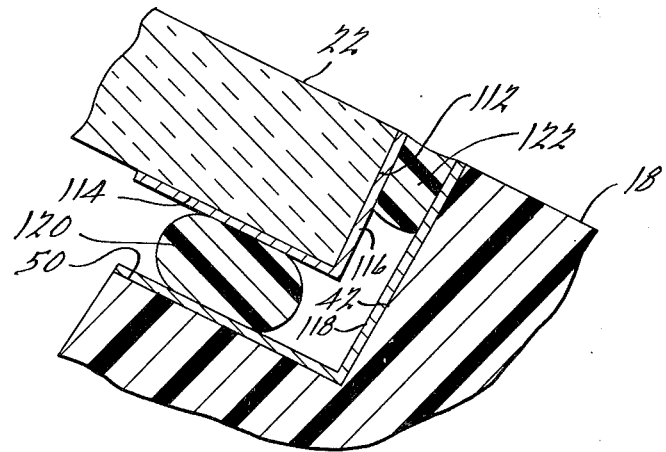

REMOVABLE TRANSPARENT ROOF PANEL FOR MOTOR VEHICLES

BACKGROUND AND SUMMARY OF THE INVENTION

This invention relates generally to removable roof panels suitable for use on motor vehicles, and more particularly to such removable roof panels having a transparent portion which affords the occupants of a motor vehicle so equipped with a feeling and scope of vision comparable to that afforded by an open vehicle while still offering the protection and comfort of an enclosed vehicle.

The American consumer has become accustomed to placing substantial emphasis on styling and appearance in the selection and purchase of a motor vehicle and associated optional equipment. Thus, it is extremely important for any optional or standard equipment which is visible to the consumer to "fit in" or conform with the overall lines and style of the vehicle itself as well as perform its intended function. Therefore, one of the primary objectives in designing a commercially viable transparent removable roof panel is to insure that it blends smoothly with the lines of the vehicle for which it is to be used and does not distract from the otherwise pleasing appearance thereof. Also, functionality is of critical importance in assuring consumer satisfaction and, therefore, such roof panels must be designed to afford a tight leak proof durable sealing engagement with the roof structure of the vehicle and must be sized to provide a close fit so as to avoid large unsightly spaces between the interior and exterior mating edges of the roof and removable panel. This is particularly important with regard to the exterior surfaces as such spaces may create air turbulence which could generate annoying noise vibrations. Also, as price is an ever present factor in the salability of a product, it is important to design such roof panels in a manner which allows economical manufacturing and assembly of the components. It is also important to insure that such panels are easy to install and remove by the purchaser.

One attempt to provide a transparent removable roof panel meeting these above stated objectives is currently being provided as an option on 1977 Oldsmobile Cutlass Supremes. These transparent roof panels comprise a suitably contoured sheet of plate glass which is surrounded by a channeled metal frame member having portions overlying perimeter portions of the inner and outer surfaces of the glass. One longitudinal edge portion of the metal frame surrounding the transparent glass member is provided with a pair of spaced apart apertures which receive tab portions affixed to the longitudinally extending center portion of the roof structure of the motor vehicle. The outer longitudinal edge of the roof panel is provided with conventional over-center clamping members which engage fore and aft portions of the motor vehicle roof structure so as to clamp the roof panel in position. The clamp members employed are similar to those conventionally provided on the opaque removable roof panels which have been provided on Corvettes for a number of years. The metal frame is of a substantial width along the longitudinal outer edge of the panel so as to accommodate the clamping members. All of the metal work is provided with a chrome-like finish which overly accentuates the roof structure of the vehicle imparting a choppy appearance thereto as well as causing the roof panel to stand out rather than blend in with the vehicle. Further, the metal frame portion which partially overlies the glass member, contributes to this choppy appearance as well as providing a source for generation of wind turbulance which may produce annoying noise vibrations. Also the use of metal frame member makes the removable panel relatively heavy and expensive to manufacture as well as providing problems in creating an effective seal in relationship with the glass portion.

Accordingly, the present invention fully meets the above stated design objectives and criteria in providing a removable transparent roof panel having a molded plastic composition frame which supports a transparent member secured thereto in such a manner as to produce a substantially continuous smooth surface over the entire panel. The molded plastic composition frame member is designed to be manufactured very economically and also provides a smooth uncluttered appearance which allows the roof panel blend smoothly with the roof lines of the motor vehicle to which it is to be installed as no exteriorly projecting molding strips are required. As the frame member is fabricated from a plastic composition, it may be easily styled to accommodate any roof contour and is uniquely adapted to allow a lightweight panel which may be easily removed and reinstalled by the owner thereof. Also, the transparent member and surrounding frame are designed in such a manner as to allow the transparent member to be secured to the frame in a weather-tight sealing relationship without the need for any chrome or metallic framing members, thus avoiding any accentuation of the roof and also insuring a smooth laminar air flow across the surface thereof thus minimizing the possibility of wind noises. Also, if desired, the frame member may be easily color coordinated with the vehicle color scheme and may even include a complementary tinting of the transparent member.

Additional and other features and advantages of the present invention will become apparent in the subsequent description and the appended claims taken in conjunction with the accompanying drawings.

BRIEF DESCRIPTION OF THE DRAWINGS

FIG. 3 is a view of the bottom or interiorly facing side of the removable transparent roof panel of the present invention;

FIG. 4 is an enlarged sectional view of a portion of the removable transparent roof panel of the present invention illustrating the operative relationship of the transparent member and surrounding frame portion thereof;

DESCRIPTION OF THE PREFERRED EMBODIMENT

Figure 1:
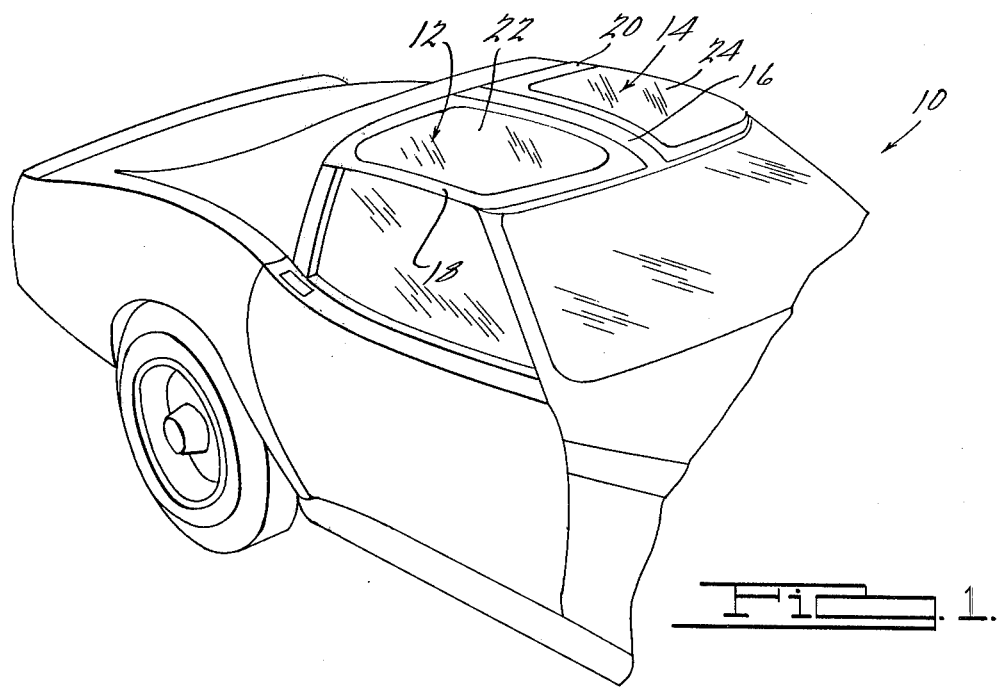
FIG. 1 illustrates a pair of removable transparent roof panels in accordance with the present invention in an installed relationship upon the roof portion of a conventional motor vehicle.

Referring now to FIG. 1 there is shown a motor vehicle illustrated generally at 10 having a pair of transparent removable roof panels 12 and 14 installed on opposite sides thereof immediately above the driver's seat and the laterally adjacent passenger seat. Removable roof panels 12 and 14 are adapted to cover substantially the entire roof area immediately above the passenger and driver seating locations and are spaced apart by a longitudinally extending structural portion 16 of the roof structure of the motor vehicle 10. Each of these removable roof panels includes transparent members 22 and 24 surrounded by framing members 18 and 20. As removable transparent roof panels 12 and 14 are substantially identical in construction, differing only in that one is the mirror image of the other with respect to shape and contour, only one of such panels will be described in detail.

Figure 2:
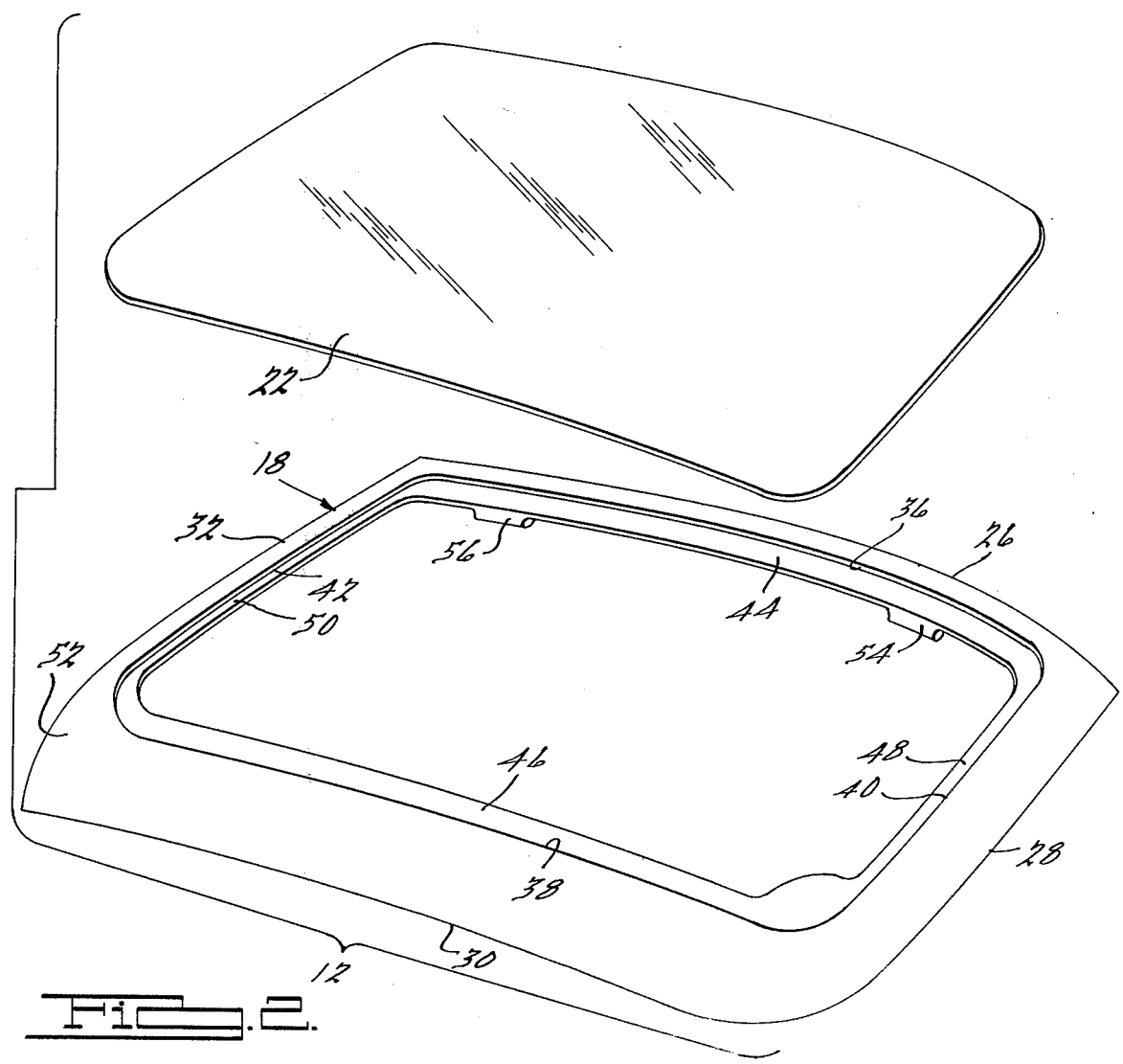
FIG. 2 is an exploded perspective view of the transparent roof panel of the present invention showing the transparent member removed from and above the frame member.

As best seen in FIG. 2 removable transparent roof panel 12 comprises a generally rectangular frame member 18 having a compound curved contour adapted to allow outer edge portions 26, 28, 30 and 32 thereof to conform to the corresponding contours of the roof structure of the motor vehicle to which the panels are to be installed. Framing member 18 has a generally rectangular shaped opening 34 provided therein into which transparent member 22 is to be installed. Opening 34 is defined by substantially parallel spaced apart longitudinally extending edges 36 and 38 spaced inward from respective outer edge portions 26 and 30 and substantially parallel spaced apart transversely extending edges 40 and 42 also spaced inward from respective transverse outer edge portions 28 and 32. The intersection of each of longitudinally extending edges 36 and 38 and transversely extending edges 40 and 42 is slightly rounded so as to avoid the possibility of stress concentrations occurring at these points which could result in cracking of frame member 18. The spacing between edges 36, 38, 40 and 42 will be slightly greater than the length and width respectively of transparent member 22 so as to allow transparent member 22 to fit easily within this opening and also to allow a relatively narrow bead of a resilient sealing compound to be injected between the edge of transparent member 22 and respective edges 36, 38, 40 and 42 of frame member 18.

Frame member 18 also has a flange portion extending into opening 34 from each of edges 36, 38, 40 and 42 including portions 44, 46, 48 and 50 which are adapted to support transparent member 22 within opening 34. The inner edges of this flange portion are also provided with rounded corners to avoid any stress concentrations. Portions 44 and 46 are slightly wider than portions 48 and 50 and each of the portions are spaced below top surface 52 of frame member 18 a distance equal to or slightly greater than the thickness of transparent member 22 so as to allow frame member 18 and transparent member 22 to form a substantially smooth continuous exterior surface to promote a laminar air flow thereacross and thus minimize any noise generating air turbulence.

Edge 38 of opening 34 is spaced inward from outer edge 30 a slightly greater distance than the spacing between other respective edge portions so as to accommodate latching hardward for securing removable panel to the vehicle as described in greater detail below. Also frame member 18 is provided with a pair of spaced apart downwardly projecting protrusions 54 and 56 along outer edge 26 which are adapted to accommodate mounting tabs also described in greater detail below.

Transparent member 22 will preferably be fabricated from a safety plate glass similar to that employed for automotive windshield constructions as this type of glass is highly resistant to shattering and glass offers a hard scratch resistant durable surface. However, it should be noted that should it be desirable various other materials may be easily substituted therefore, such as for example, a plexiglass, polycarbonate composition, or other suitable transparent material. Additionally, should it be desirable transparent member 22 may be tinted in any desired color such as for example, a color complementary to the vehicle color itself, or even a matching color so as to allow the roof panel to blend in with and not detract from the style and appearance of the vehicle.

Framing member 18 will preferably be formed from a plastic composition material such as a structural foam type plastic composition. Valox structural foam available from General Electric Corporation has been used in conjunction with an injection molding process to form various prototype transparent removable roof panels with excellent results. A structural foam type material has been found to be preferable to both fiberglass as well as other plastic compositions as it allows frame member 18 to be found with a relatively thick cross section and wide flat reinforcing ribs so as to insure a strong and durable frame member. Also, it has been found that the use of structural foam material allows the frame member to be formed with a smooth exterior surface which will readily accept a variety of finishes such as a paint for example, thereby providing a high lustre exterior finish comparable to that provided on the motor vehicle body. Also, the inner exposed surfaces of the frame member can easily be simultaneously formed with a grained surface which may be easily provided with a finish corresponding to the interior color scheme of the motor vehicle. It should be noted, however, that a wide variety of other plastic composition materials may be easily substituted therefore, and also that these frame members may be easily fabricated by a sheet molding process or any other suitable molding process.

Referring now to FIG. 3, removable roof panel 12, including frame member 18 and transparent member 22, is illustrated therein as seen from the interior or bottom side thereof. As seen therein, perimeter edge 58 defines the outer limits of transparency of transparent member 22 when viewed from the interior of the vehicle and broken lines 60 and 62 define the respective edges 36, 38, 40 and 42 defining opening 34. Frame member 18 also is formed with an interior reinforcing rib 64 extending around three sides thereof and substantially parallel to respective outer frame edges 26, 28 and 32 and serves to impart a structural reinforcement and rigidity to framing member 18. A pair of pockets 66 and 68 are provided on the underside of flange portion 46 of framing member 18 and adjacent opposite longitudinal ends thereof. Pocket 66 is defined by outward (as viewed in FIG. 3) extending wall protrusion 70 extending longitudinally and adjacent to edge 72 of flange portion 46, outward extending wall protrusion 74 also extending longitudinally and spaced outward from wall protrusion 70 toward outer edge 30 and a short interconnecting wall protrusion 76 extending between the inner end of wall protrusion 70 and wall protrusion 74. Pocket 66 is open on the forth side 77 so as to allow overcenter clamping member 78 to extend longitudinally outward therefrom. Similarly pocket 68 is defined by outward extending wall protrusion 80 extending longitudinally and adjacent to edge 72 of flange portion 46, outward extending wall protrusion 74 also extending longitudinally and spaced outward from wall portion 80 toward outer edge 30 and a short interconnecting wall protrusion 82 extending between the inner end of wall protrusion 80 and wall protrusion 74. Pocket 68 is also open on a forth side 84 so as to allow a second overcenter clamping member 86 to extend longitudinally outward therefrom. Clamping members 78 and 86 are identical to the outboard clamping members presently in use on the opaque removable roof panels of Corvettes and are positioned on frame member 18 so as to engage forward and rear portions of the motor vehicle in such a manner as to exert a downward clamping action between frame member 18 and the roof structure of the motor vehicle. Clamping members 78 and 86 will each be retained within respective pockets 66 and 68 by suitable fastening means extending through respective side wall protrusions 70, 74 and 80 and 74. As clamping members 78 and 86 are known in the art further description thereof is believed unnecessary.

In order to secure the inner edge 26 of framing member 18 to the roof portion of motor vehicle 10, a pair of outwardly extending tab members 88 and 90 are provided which are secured to respective protrusions 54 and 56 of framing member 18 adjacent and inboard of edge 26 thereof through the agency of a plurality of screw fasteners 92 extending therethrough and engaging frame member 18. Each of these tab members 88 and 90 are substantially identical and will be described in greater detail hereinafter. A positioning projection 94 is secured to a flange portion 96 extending into opening 34 from a position adjacent the intersection of flange portions 46 and 48 by a pair of screw fasteners 98. Positioning projection 94 has a conical shaped projection 100 extending outward as viewed in FIG. 3 which is adapted to engage an opening provided along the windshield frame of the motor vehicle in order to accurately position removable roof panel 12 with respect thereto. Positioning projection 94 is also substantially identical to the positioning projection conventionally provided on the opaque removable roof panels provided on current Corvettes and therefore, further, more detailed description thereof is believed unnecessary.

As will be noted in FIG. 1, removable roof panels 12 and 14 each extend outward to engagement with a portion of the door of the motor vehicle. Accordingly, means must be provided adjacent the outer edge 30 of each removable roof panel 12 and 14 to accommodate a gasket means for sealingly engaging the door frame or window portion of the motor vehicle. A plurality of elongated slots 102, 104, 106 and 108 are provided adjacent edge 30 of frame member 18 and are adapted to accommodate a gasket retention member 110 in such a manner as to allow inward and outward adjustment thereof so as to allow for manufacturing tolerances, prevent any annoying rattling and to insure that a weatherproof sealing engagement with the door frame or door window is provided.

As seen in FIG. 4, transparent member 22 overlies and is supported by the inwardly extending flange portion 50 of framing member 18. Transparent member 22 is therefore coated along its peripheral edge 112 and along a perimeter portion of lower surface 114 thereof with a suitable opaque primer 116 so as to block out the unsightly view of the supporting and inner edge portions 50 and 42 of framing member 18. Similarly, framing member 18 has edge portion 42 and inwardly extending flange portion 50 coated with a suitable primer 118. In order to retain transparent member 22 within opening 34 a suitable adhesive material 120 is layed along flange portion 50 provided in frame member 18 and cooperates with the primer coatings 116 and 118 provided on both transparent member 22 and framing member 18 to securely retain transparent member 22 within opening 34. In order to provide a smooth finished surface, promote laminar air flow and also to insure against dirt becoming lodged between transparent member 22 and framing member 18 and also to further insure against entry of any moisture, conventional windshield sealant material 122 is injected between edge portion 42 of framing member 18 and the peripheral edge 112 of transparent member 22. It has been found that a urethane adhesive gives excellent performance for securing transparent member 22 to frame member 18 and particularly type 9981450 available from Essex Chemical Company, although any other suitable adhesive may be suitable therefor. The primers will preferably be of the lacquer type due to the ease of application, rapid drying characteristics and ability to bond well with the urethane type adhesive material. Any suitable conventional windshield sealant may be employed between edges 112 and 42 such as an RTV sealant. It should be noted that while the application of the primer coatings, adhesive and sealant has been described with reference to only a single mating and adjacent surfaces of the transparent member 22 and frame member 18 that each of these materials are applied continuously to the corresponding surfaces around the entire perimeter of opening 34 and transparent member 22. Additionally it should be noted that it will generally be desirable to apply primer 116 along surface 114 coextensively with the underlap of flange portions 44, 46, 48 and 50.

Figure 5:
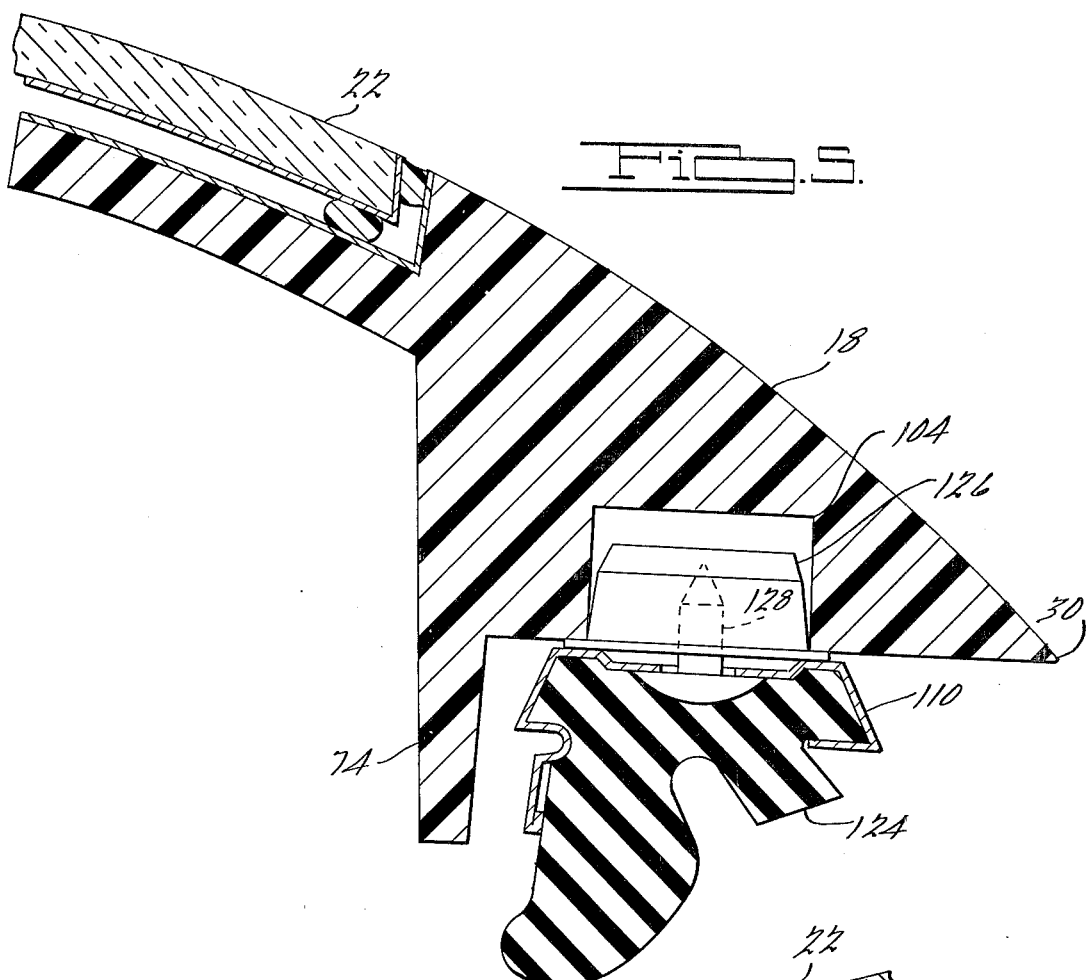
FIG. 5 is an enlarged sectionalized view of a portion of the present invention illustrating a door engaging portion of the frame member and associated sealing means, the section being taken along line 5—5 of FIG. 3.
Figure 6:
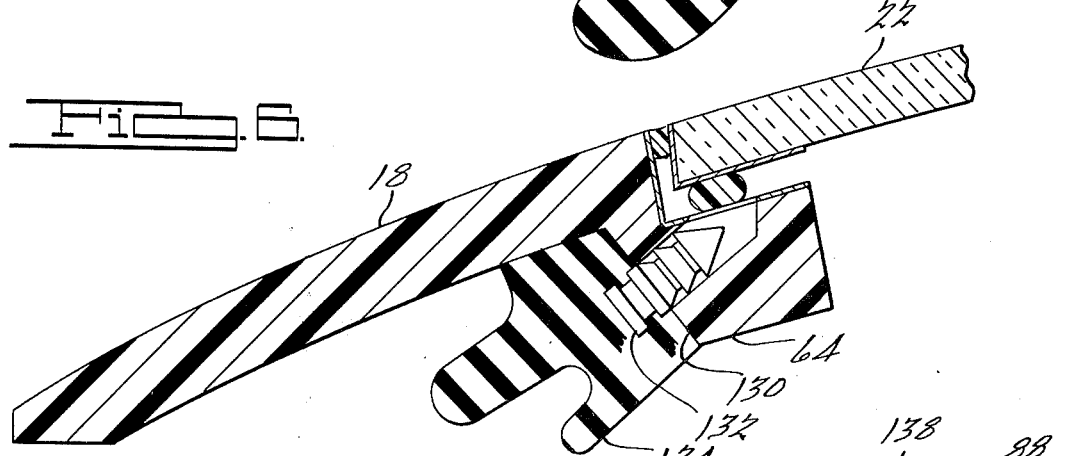
FIG. 6 is an enlarged sectionalized view of a portion of the present invention illustrating another portion of the frame member and associated sealing means, the section being taken along line 6—6 of FIG. 3.

Referring now to FIG. 5 and as previously mentioned, as removable roof panel 12 extends outwardly and is adapted to engage either a door frame or window portion of the motor vehicle along edge 30, a suitable gasket retention member 110 and gasket 124 must be provided thereon adjacent surface 30 to creating a sealing relationship with such door frame or window surface. Such an arrangement is illustrated in FIG. 5 and comprises a gasket retention member 110 of an irregular shape into which a resilient gasket member 124 is inserted and retained. Retention member 110 will generally be fabricated of a thin gauge metal material and both the retention member and gasket member 124 are secured to frame member 18 through the cooperation of a plurality of elongated oval shaped plastic inserts 126 disposed within elongated slots 102, 104, 106 and 108 by means of suitable fasteners such as screw fasteners 128 for example. In order to adjust this gasket arrangement one need merely position the gasket with respect to the door panel or window and then screw fastener 128 through plastic insert 126. In order to insure a complete seal around the periphery of removable roof panel 12 gasket 124 will be continuous around the entire periphery of framing member 18. Gasket member 124 may be secured to framing member 18 along an inclined side 130 of reinforcing rib 64 by means of a plurality of suitable fasteners 132 which are inserted into the structural foam plastic composition of framing member 18 as illustrated in FIG. 6. This gasket arrangement and means for attaching is substantially identical to that currently employed in affording a sealing relationship between the removable roof panels and roof portion of the current model Corvettes and therefore, a more detailed description thereof is believed unnecessary.

Figure 7:
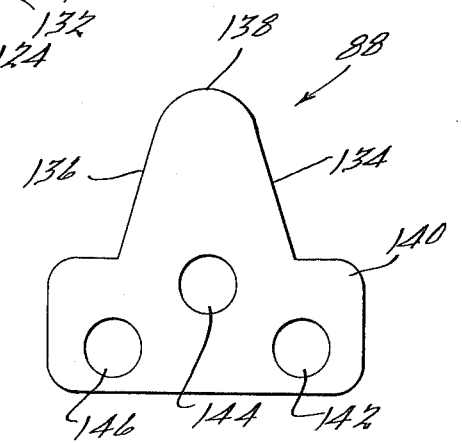
FIG. 7 is a view of a mounting tab in accordance with the present invention for securing the longitudinal inner edge of the panel.

FIG. 7 illustrates the tab member which is adapted to secure the inner edge portion 26 of framing member 18 to the roof portion of the motor vehicle. Tab members 88 and 90 are substantially identical and, therefore, only one tab member 88 will be described in detail. As illustrated therein tab member 88 is provided with an outwardly projecting portion defined by converging lateral sides 134 and 136 and has an arcuate shaped end portion 138. A main body portion 140 of tab member 88 is provided with three spaced apart apertures 142, 144, and 146 which are adapted to accommodate fastening means 92 for securing tab member 88 to mounting protrusions 54 and 56 provided on frame member 18. Thus, tab member 88 will project toward the center portion 16 of the motor vehicle 10 and will be received within slots provided therealong so as to retain the inner edge 20 of frame member 18 in a sealing engagement with a flange portion provided in the roof structure.

Both tab members 88 and 90 as well as positioning projection 94 may be easily fabricated from a plastic composition material such as by injection molding. However, if desired they may also be fabricated from metal or any other suitable material.

In order to securely retain tab members 88 and 90 and positioning projection 94 it has been found desirable to imbed a plurality of helicoils at appropriate locations within frame member 18 by a sonic welding process. These helicoils are relatively short cylindrical cylinders having a threaded interior for receiving screw fasteners 92 and 98 and are provided with circumferential longitudinally extending ribs on the outer surface thereof which engage the frame member 18 to resist the torsional forces as screw fasteners 92 and 98 are tightened. Additionally, an enlarged diameter outwardly projecting annular flange portion is also provided on these helicoils to aid in retaining them within frame member 18. As such helicoils are known, a further more detailed description thereof is believed unnecessary.

Thus, the present invention provides a unique removable roof panel having a transparent member secured thereto and provides extremely aesthetically pleasing appearance when installed on the roof portion of a motor vehicle and yet affords the occupants of such a motor vehicle a clear unobstructed view of the outside comparable to that typically furnished by convertibles but without subjecting such occupants to the uncomfortable and generally undesirable weather conditions as may exist outside of the vehicle. Further, when weather conditions are desirable the occupants of the car may remove the roof panels very easily by merely releasing clamp members 78 and 86 and tilting removable panels 12 and 14 upward and withdrawing tab portions 88 and 90. The panels may then be stored in a trunk or other suitable location within or without the motor vehicle and the occupants are afforded substantially all the benefits of a convertible vehicle. The transparent roof panel of the present invention offers a unique transparent panel member which is extremely economical to manufacture in that the framing member may be easily fabricated from any suitable plastic composition by an injection molding process or other suitable molding process and yet is highly durable. Further, as the unique construction of this removable roof panel does not require any molding either on the motor vehicle itself or between the engagement of the frame member and the transparent members it affords an extremely clean aesthetically pleasing appearance when installed upon a motor vehicle and may if desired be fabricated with a tinted transparent insert and frame member both color coordinated to the vehicle color itself. When in a color coordinated version it is apparent that the roof panel will blend almost completely with the motor vehicle and give the appearance of a conventional roof structure while still affording the occupants of the vehicle the benefits of a transparent roof panel.

While it will be apparent that the preferred embodiment of the invention disclosed provides substantial advantages as set forth above, it will be appreciated that the invention is susceptible to modification, variation and change without departing from the proper scope or fair meaning of the subjoined claims.

I claim:
1. A removable roof panel having a transparent portion adapted for use on a motor vehicle comprising:
   a supporting frame having an opening therein and adapted to be installed in and sealingly engage a roof portion of a motor vehicle, said supporting frame being fabricated from a plastic composition;
   latching means attached to said frame for removably securing said frame in operative relationship to said roof portion;
   a transparent member overlying said opening having a contour substantially corresponding to the contour of said motor vehicle roof portion and adapted to cooperate with said frame so as to form a substantially smooth continuous roof surface when said panel is installed on said motor vehicle;
   said latch means being positioned on said frame member so as to be disposed below the outer surface of said roof portion thereby providing a substantially smooth continuous roof surface when said panel is installed in operative relationship on a motor vehicle;
   adhesive means fixedly securing said transparent member to said supporting frame; and
   gasket means secured to said frame and adapted to engage portions of said motor vehicle to create a sealing relationship between said frame and said motor vehicle.

2. A removable roof panel as set forth in claim 1 wherein said supporting frame has a perimeter flange portion extending into said opening for supporting said transparent member within said opening.

3. A removable roof panel as set forth in claim 2 wherein said flange portion is spaced below a top surface of said frame a distance equal to or slightly greater than the thickness of said transparent member.

4. A removable roof panel as set forth in claim 2 wherein said securing means secures said transparent member to said flange portion.

5. A removable roof panel as set forth in claim 2 wherein said transparent member has an opaque coating along its peripheral edge and a portion of one side thereof said one side facing said flange portion and said portion being a perimeter strip of a width equal to the width of said flange portion.

6. A removable roof panel as set forth in claim 2 wherein said frame and said transparent member are contoured to conform to substantially the same curvature as said roof portion of said motor vehicle so as to form a substantially continuous smooth roof surface when installed on said motor vehicle.

7. A removable roof panel as set forth in claim 1 wherein said latching means include a pair of spaced apart tab members secured to said frame member along one edge thereof, said tab members having a portion engaging slots provided in said roof portion to retain said panel in operative relationship to said roof portion, said frame member having a plurality of helicoils embedded therein and said tab members being secured to said frame member by a plurality of screw fasteners engaging said helicoils.

8. A removable roof panel having a transparent portion adapted for use on a motor vehicle comprising:
- a plastic composition supporting frame having an opening therein and adapted to be removably installed in a roof portion of a motor vehicle;
- an inwardly extending reinforcing rib extending around at least three sides of said opening;
- a transparent member overlying said opening and supported by said frame said transparent member having a contour substantially corresponding to the contour of said motor vehicle roof portion and adapted to cooperate with said frame so as to form a substantially smooth continuous roof surface when said panel is installed on said motor vehicle;
- adhesive means disposed between said transparent member and said frame to fixedly secure said transparent member to said frame;
- gasket means secured to said frame and adapted to engage portions of said motor vehicle to create a sealing relationship between said frame and said motor vehicle; and
- latching means for securing said panel to said roof portion of said motor vehicle, said latch means being positioned on said frame member so as to be disposed below the outer surface of said roof portion thereby providing a substantially smooth continuous roof surface when said panel is installed in operative relationship on a motor vehicle.

9. A removable roof panel as set forth in claim 8 further comprising a perimeter flange portion extending into said opening for supporting said transparent member, said flange portion being spaced below a top surface of said frame member a predetermined distance, said distance being sufficient to insure that said transparent member and said frame member form a substantially flush surface.

10. A removable roof panel as set forth in claim 9 wherein said transparent member has an opaque coating around its peripheral edge and a portion of one side thereof, said one side facing said flange portion and said portion being a perimeter strip of a width equal to the width of said flange portion, said adhesive means cooperating with said coating to retain said transparent member within said opening.

11. A removable roof panel as set forth in claim 10 wherein said flange portion also has an opaque coating on one side thereof, said side facing said transparent member, said opaque coating is a lacquer primer, and said adhesive material also cooperates with said coating of said flange portion to retain said transparent member.

12. A removable roof panel as set forth in claim 11 wherein said adhesive means is of a urethane composition adhesive material.

13. A removable roof panel as set forth in claim 11 wherein said frame and said transparent member are contoured to conform to substantially the same curvature as said roof portion of said motor vehicle so as to form a substantially continuous smooth roof surface when installed on said motor vehicle.

14. A removable roof panel as set forth in claim 13 wherein said latching means include a pair of spaced apart tab members secured to said frame member along one edge thereof, said tab members having a portion engaging slots provided in said roof portion to retain said panel in operative relationship to said roof portion, said frame member having a plurality of helicoils embedded therein and said tab members being secured to said frame member by a plurality of screw fasteners engaging said helicoils.

15. A removable roof panel as set forth in claim 14 wherein said frame is fabricated from a structural foam material.

16. A removable roof panel as set forth in claim 15 wherein said transparent member is of safety plate glass.

17. A removable roof panel having a transparent portion adapted for use on a motor vehicle comprising:
- a plastic composition supporting frame having an opening therein and adapted to be removably installed in an opening provided in a roof portion of a motor vehicle, said supporting frame having a top surface contoured to correspond to the contour of the roof portion of said motor vehicle and of a size to allow only a slight space between said supporting frame and said roof portion;
- latching means attached to said supporting frame for securing said frame to said motor vehicle,
- a perimeter flange portion extending into said opening and spaced below said top surface of said supporting frame;
- a transparent member disposed within said opening and supported by said flange portion, said transparent member having a contour corresponding to the contour of said frame and a thickness equal to the spacing between said flange and said frame top surface so as to allow said transparent member and said frame to form a smooth substantially continuous contour;
- adhesive means disposed between said transparent member and said flange portion to securely retain said transparent member within said opening;
- sealing means disposed between the perimeter edge portion of said transparent member and said frame to prevent passage of moisture and dirt; and
- gasket means secured to said frame and adapted to engage portions of said motor vehicle to create a sealing relationship between said frame and said motor vehicle.

18. A removable roof panel as set forth in claim 17 wherein said transparent member has an opaque coating around its peripheral edge and a portion of one side thereof, said one side facing said flange portion and said portion being a perimeter strip of a width equal to the width of said flange portion, said adhesive means cooperating with said coating to retain said transparent member within said opening.

19. A removable roof panel as set forth in claim 18 wherein said flange portion also has an opaque coating on one side thereof, said side facing said transparent member, said opaque coating is a lacquer primer, and said adhesive material also cooperates with said coating of said flange portion to retain said transparent member.

20. A removable roof panel as set forth in claim 19 wherein said frame is fabricated from a structural foam material and is provided with a smooth high lustre finish on said top surface, and a grained finish on an inner surface thereof, and said transparent member is of a safety plate glass.

* * * * *